United States Patent
Ahn et al.

(10) Patent No.: US 8,930,929 B2
(45) Date of Patent: Jan. 6, 2015

(54) RECONFIGURABLE PROCESSOR AND METHOD FOR PROCESSING A NESTED LOOP

(75) Inventors: Min-Wook Ahn, Seoul (KR); Dong-Hoon Yoo, Seoul (KR); Jin-Seok Lee, Seoul (KR); Bernhard Egger, Seoul (KR); Tai-Song Jin, Seoul (KR); Won-Sub Kim, Anyang-si (KR); Hee-Jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 13/086,629

(22) Filed: Apr. 14, 2011

(65) Prior Publication Data

US 2012/0102496 A1   Apr. 26, 2012

(30) Foreign Application Priority Data

Oct. 21, 2010   (KR) .................. 10-2010-0103095

(51) Int. Cl.
*G06F 9/45* (2006.01)
*G06F 9/50* (2006.01)

(52) U.S. Cl.
CPC .................................. *G06F 9/5066* (2013.01)
USPC ...................................................... 717/160

(58) Field of Classification Search
None
See application file for complete search history.

(56) References Cited

U.S. PATENT DOCUMENTS

| | | | |
|---|---|---|---|
| 5,535,393 A | 7/1996 | Reeve et al. | |
| 6,035,125 A * | 3/2000 | Nguyen et al. | 717/160 |
| 6,192,515 B1 * | 2/2001 | Doshi et al. | 717/161 |
| 6,341,371 B1 * | 1/2002 | Tandri | 717/158 |
| 6,374,403 B1 * | 4/2002 | Darte et al. | 717/161 |
| 6,539,541 B1 * | 3/2003 | Geva | 717/150 |
| 6,820,250 B2 | 11/2004 | Muthukumar et al. | |
| 6,988,266 B2 * | 1/2006 | Lam et al. | 717/160 |
| 7,140,009 B2 * | 11/2006 | Tal et al. | 717/160 |
| 7,631,305 B2 * | 12/2009 | Rong et al. | 717/161 |
| 7,926,046 B2 * | 4/2011 | Halambi et al. | 717/151 |
| 8,024,717 B2 * | 9/2011 | Yoo et al. | 717/150 |
| 2005/0097509 A1 * | 5/2005 | Rong et al. | 717/106 |
| 2006/0248516 A1 * | 11/2006 | Gordon | 717/139 |
| 2008/0141013 A1 | 6/2008 | Klima et al. | |
| 2008/0222620 A1 * | 9/2008 | Little et al. | 717/149 |
| 2008/0294882 A1 | 11/2008 | Jayapala et al. | |
| 2009/0077351 A1 * | 3/2009 | Nakaike et al. | 712/220 |
| 2009/0235052 A1 * | 9/2009 | Kudo | 712/205 |
| 2010/0153654 A1 * | 6/2010 | Vorbach et al. | 711/137 |
| 2010/0169612 A1 * | 7/2010 | Persson et al. | 712/205 |

FOREIGN PATENT DOCUMENTS

| | | |
|---|---|---|
| JP | 1993-298272 | 11/1993 |
| KR | 10-2006-0087836 | 8/2006 |

* cited by examiner

*Primary Examiner* — Don Wong
*Assistant Examiner* — Daxin Wu
(74) *Attorney, Agent, or Firm* — NSIP Law

(57) ABSTRACT

A reconfigurable processor which merges an inner loop and an outer loop which are included in a nested loop and allocates the merged loop to processing elements in parallel, thereby reducing processing time to process the nested loop. The reconfigurable processor may extract loop execution frequency information from the inner loop and the outer loop of the nested loop, and may merge the inner loop and the outer loop based on the extracted loop execution frequency information.

19 Claims, 8 Drawing Sheets

US 8,930,929 B2

RECONFIGURABLE PROCESSOR AND METHOD FOR PROCESSING A NESTED LOOP

CROSS-REFERENCE TO RELATED APPLICATION(S)

This application claims the benefit under 35 U.S.C. §119(a) of Korean Patent Application No. 10-2010-0103095, filed on Oct. 21, 2010, in the Korean Intellectual Property Office, the entire disclosure of which is incorporated herein by reference for all purposes.

BACKGROUND

1. Field

The following description relates to a technique for processing a nested loop, and additionally, to a technique for processing a nested loop by allocating commands included in a nested loop to a plurality of processing elements and processing the allocated commands.

2. Description of the Related Art

Reconfigurable architecture refers to architecture in which a hardware configuration of a computing apparatus may be changed to more efficiently process a given task.

In processing a task in a hardware manner, even a slight change in the task may not be efficiently dealt with because hardware functions are rigid. In contrast, in processing a task in a software manner, software can be more easily optimized to the task, but the processing speed is slower than processing in a hardware manner.

Reconfigurable architecture has the advantages of both hardware/software processing. For example, reconfigurable architecture has drawn significant attention from a digital signal processing field in which the same process is recursively executed.

In general, a digital signal processing procedure includes multiple loop operations that repeat the same task. To increase loop operation speed, loop level parallelism (LLP) may be used. A representative example of LLP is software pipelining.

Typically, an inner loop and an outer loop which are included in a nested loop are processed in series in reconfigurable architecture. However, the series processing may substantially lengthen the processing time of the loop operation.

SUMMARY

In one general aspect, there is provided a reconfigurable processor for processing a nested loop, the reconfigurable processor including an extracting unit configured to extract loop execution frequency information from each of an inner loop and an outer loop which are included in the nested loop, and a loop merging unit configured to merge the inner loop and the outer loop based on the extracted loop execution frequency information.

The reconfigurable processor may further comprise a scheduler configured to allocate a command of the inner loop to at least one of a plurality of processing elements and to allocate a command of the outer loop to at least one of the remaining processing elements which have not been allocated the command of the inner loop.

The loop merging unit may be further configured to generate third loop execution frequency information based on first loop execution frequency information of the inner loop and second loop execution frequency information of the outer loop, and to generate a loop control command to control commands of the merged loop to be executed as many times as a value of the third loop execution frequency information.

The loop merging unit may be further configured to copy a command of the inner loop and/or a command of the outer loop using a loop peeling technique.

The reconfigurable processor may further comprise a plurality of processing elements, each comprising a frequency register file configured to store the first loop execution frequency information, and a counter configured to increase a counter value at each occasion of a predefined event, and to output the counter value, wherein the loop merging unit is further configured to generate a storage command to store the first loop execution frequency information in the frequency register file.

The loop merging unit may be further configured to insert an execution operand into the command of the outer loop, the execution operand comprising location information indicating where the first loop execution frequency information is stored in the frequency register file.

Each of the processing elements may be further configured to determine whether the execution operand is present in the allocated command, and in response to determining that the execution operand is present, to execute the allocated command each time the first loop execution frequency information stored in the frequency register file becomes the same as the counter value.

The counter may be further configured to increase the counter value each time a command included in the loop is executed or each time the loop is executed.

The loop merging unit may be further configured to extract the first loop execution frequency information and the second loop execution frequency information from loop control commands of the inner loop and outer loop, respectively.

The value of third loop execution frequency information may be the product of a value of the first loop execution frequency information and a value of the second loop execution frequency information.

The reconfigurable processor may further comprise a scheduler configured to allocate a command of the inner loop and a command of the outer loop to a plurality of processing elements, wherein the plurality of processing elements are configured to process the command of the inner loop and the command of the outer loop in parallel.

In another aspect, there is provided a method of processing a nested loop, the method including extracting loop execution frequency information from each of an inner loop and an outer loop which are included in the nested loop, and merging the inner loop and the outer loop of the nested loop based on the extracted loop execution frequency information.

The method may further comprise allocating a command of the inner loop to at least one of a plurality of processing elements, and allocating a command of the outer loop to at least one of the remaining processing elements which have not been allocated the command of the inner loop.

The merging of the inner loop and the outer loop may comprise generating third loop execution frequency information based on first loop execution frequency information of the inner loop and second loop execution frequency information of the outer loop, and generating a loop control command to control commands of the merged loop to be executed as many times as a value of the third loop execution frequency information.

The merging of the inner loop and the outer loop may comprise copying a command of the inner loop and/or a command of the outer loop using a loop peeling technique.

The merging of the inner loop and the outer loop may comprise generating a storage command to store the first loop execution frequency information in a frequency register file included in each of the processing elements.

The merging of the inner loop and the outer loop may comprise inserting an execution operand into the command of the outer loop, the execution operand including location information indicating where the first loop execution frequency information is stored in the frequency register file.

The method may further comprise determining whether the execution operand is present in the allocated command, and in response to determining that the execution operand is present, executing the allocated command each time the first loop execution frequency information stored in the frequency register file becomes the same as a counter value output from a counter.

The counter may increase a counter value each time a command included in the loop is executed or each time the loop is executed, and the counter may output the counter value.

The extracting of the loop execution frequency information may comprise extracting the first loop execution frequency information and the second loop execution frequency information from loop control commands of the inner loop and outer loop, respectively.

The value of the third loop execution frequency information may be the product of a value of the first loop execution frequency information and a value of the second loop execution frequency information.

The method may further comprise allocating a command of the inner loop and a command of the outer loop to a plurality of processing elements, wherein the plurality of processing elements are configured to process the command of the inner loop and the command of the outer loop in parallel.

Other features and aspects may be apparent from the following detailed description, the drawings, and the claims.

Figure 1:
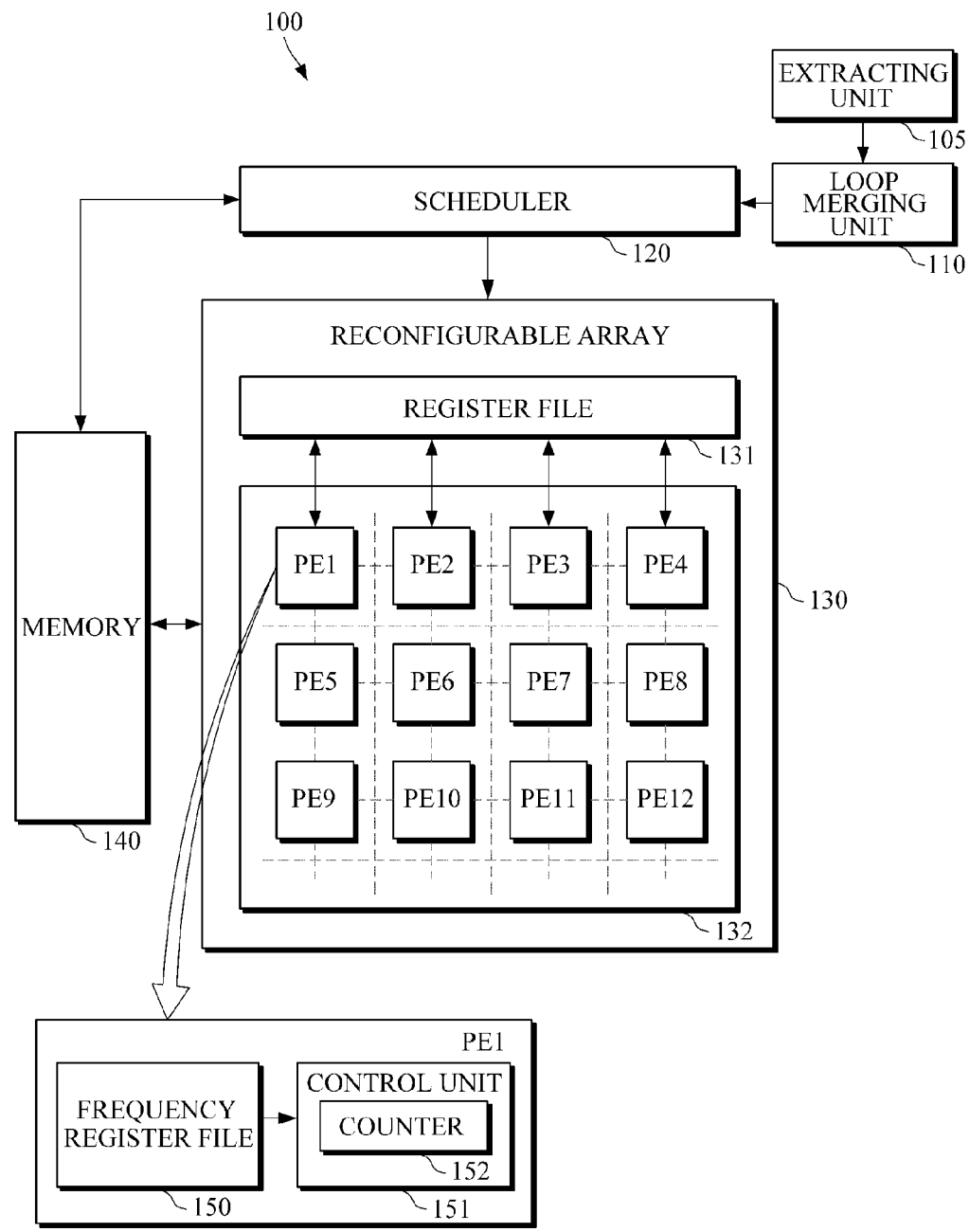
FIG. 1 is a diagram illustrating an example of a reconfigurable processor

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a reconfigurable processor.

Referring to the example illustrated in FIG. 1, reconfigurable processor 100 includes an extracting unit 105, a loop merging unit 110, a scheduler 120, a reconfigurable array 130, and a memory 140. For example, the reconfigurable processor 100 may be included in various devices, for example, a mobile terminal, a computer, a personal digital assistant (PDA), an MP3 player, and the like.

As an example, a command may be an operation or instruction to be executed by a processing element. For example, the command may correspond to a plurality of operations or instructions included in a loop body. A nested loop indicates a loop including an inner loop and an outer loop.

The extracting unit 105 may extract information about the number of times the inner loop and the outer loop are executed. For example, the extracting unit 105 may extract information about the number of times the inner loop is executed (hereinafter, referred to as a "first loop execution frequency information") and information about the number of times the outer loop is executed (hereinafter, referred to as a "second loop execution frequency information") from a loop control command. The loop control command may be used to control the number of times a loop is executed, and may include loop execution frequency information.

The loop merging unit 110 may merge the inner loop and the outer loop based on the extracted loop execution frequency information.

For example, the loop merging unit 110 may generate third loop execution frequency information based on the first loop execution frequency information about the inner loop and the second loop execution frequency information about the outer loop. For example, the loop merging unit 110 may generate a loop control command to execute commands of the merged loop as many times as a value indicated by the third loop execution frequency information. The third loop execution frequency information may be the product of the first loop execution frequency information and the second loop execution frequency information. As an example, if the first loop execution frequency is 10 and the second loop execution frequency is 8, the third loop execution frequency is the product of 10*8=80.

The loop merging unit 110 may generate a storage command to store the first loop execution frequency information in a frequency register file 150 of the processing element 132. For example, the loop merging unit 110 may change a location of the generated loop control command such that the generated loop control command becomes the last command executed from among the commands included in the merged loop.

As another example, the generated loop control command is not necessarily the last command executed from among the commands included in the merged loop. For example, the loop merging unit 110 may change the location of the command through loop peeling. The loop merging unit 110 may create an execution operand that includes location information that indicates where the first loop execution frequency information is stored, and may insert the generated execution operand into a command of the outer loop. As an example, the location information may be an address, which is further described with reference to FIGS. 2A to 2D.

The scheduler 120 may allocate the plurality of commands included in the nested loop to multiple processing elements included in the reconfigurable array 130. For example, the scheduler 120 may allocate commands of the inner loop of the merged loop to at least one of the multiple processing elements, and commands of the outer loop of the merged loop to at least one of remaining multiple processing which were not allocated commands of the inner loop.

In this example, the reconfigurable array 130 includes a register file 131 and a plurality of processing elements (PE) 132. The reconfigurable array 130 may change hardware configuration to perform an operation more efficiently. For example, the reconfigurable array 130 may change the connection statuses between PEs based on the type of operation to be processed.

The register file 131 may store various types of data for executing a command or data transmission between the PEs 132. For example, each PE 132 may access the register file 131 to read or write data to be used for executing a command. As an example, not all PEs 132 may be connected to one another. In this example, some PEs may access the register file 131 via other PEs.

The PEs 132 may execute allocated commands. The connection and the operation order of each PE 132 may be changed based on a task to be processes.

Each of the processing elements PE1, PE2, PE3, PE4, PE5, PE6, PE7, PE8, PE9, PE10, PE11, and PE12 may include a frequency register file and a control unit. In this example, the PE1 includes a frequency register file 150 and a control unit 151. The control unit 151 may include a counter 152.

The frequency register file 150 may store the first loop execution frequency information of the inner loop. The control unit 151 may control the operation of the PE1.

The counter 152 may output a counter value by increasing a value at each occasion of a predefined event. For example, the counter 152 may increase a value and output the value each time a command included in a loop is executed. As another example, the counter 152 may increase a value and output the value each time a loop is executed. The former example (hereinafter, referred to as a "first example") in which the counter value is increased each time the command included in a loop is executed may be more precise than the latter example (hereinafter, referred to as a "second example") in which the counter value is increased each time the loop is executed. In the first example, a location of a command currently being executed or a command which causes execution to be stopped may be easily recognized based on the counter value. In contrast, in the second example, the counting takes place on a loop-by-loop basis, and it may not be able to accurately recognize a command being executed.

The control unit 151 may determine whether the execution operand is present in the command allocated by the scheduler 120. For example, in response to the execution operand being present, the control unit 151 may execute the command allocated to the PE1 each time the first loop execution frequency stored in the frequency register file 150 and the counter value of the counter 152 become the same as each other. As another example, in response to the execution operand not being present, the control unit 151 may execute the command allocated to the PE1 regardless of the first loop execution frequency and the counter value. The presence of the execution operand may be used to indicate that the command of the outer loop has been allocated to the PE, and the non-presence of the execution operand may be used to indicate that the command of the inner loop has been allocated to the PE.

For example, if the first loop execution frequency is 16 and the second loop execution frequency is 8, the third loop execution frequency may be 128 (i.e. 8*16). In this example, each time the outer loop is executed once, the inner loop is executed 16 times. Accordingly, because the outer loop is executed 8 times, the total number of times the inner loop is executed is 128. The control unit 151 may determine whether an execution operand is present in the allocated command. For example, in response to the execution operand not being present, the control unit 151 may execute the command allocated to the PE1 128 times, which is the third loop execution frequency. In other words, the PE1 may execute the command ('no execution operand present') of the inner loop 128 times which is the third loop execution frequency.

As another example, in response to the execution operand being present, the control unit 151 may be allowed to execute the command allocated to the PE1 when the counter value of the counter 152 becomes 16 which is the first loop execution frequency. In other words, the PE 1 may execute the command ('execution operand present') 8 times while the merged loop is executed a total of 128 times.

The number (128) of times for executing the inner loop and the number (8) of times for executing the outer loop may be the same before and after merging the inner and outer loops.

In the example described above, the reconfigurable processor may use the frequency register file and the control unit to control the PE to execute a command of the outer loop the same number of times as before the merging.

The memory 140 may store information about the connection statuses between PEs 132, commands for processing, and information on result of processing. For example, the memory 140 may store data to be processed or results of processing. As another example, the memory 140 may store information used to drive reconfigurable processor 100, and connection status information and an operation method of the reconfigurable processor 100.

The reconfigurable processor 100 may merge the inner loop and the outer loop which are included in the nested loop, and may allocate the merged loop to the PEs in a parallel manner, thereby reducing processing time of the nested loop and a code length.

FIGS. 2A to 2D illustrate examples of procedures of merging a nested loop. For example, the nested loop may be merged by the loop merging unit shown in the example illustrated in FIG. 1.

Figure 2A:
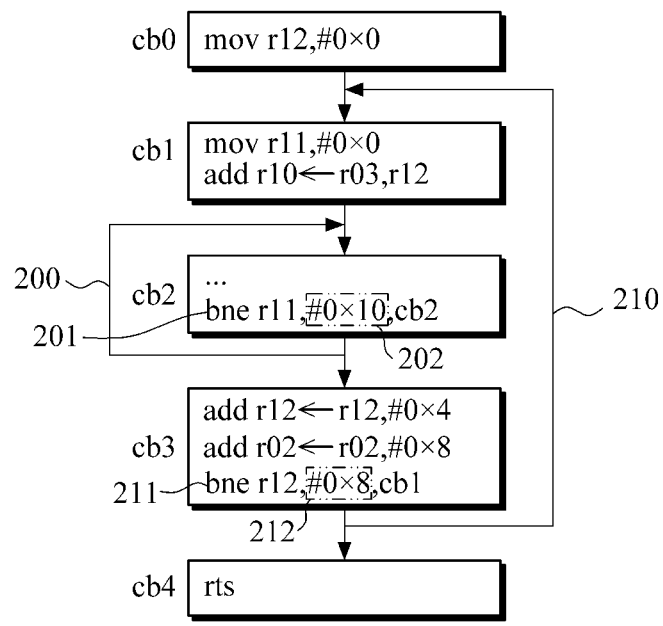
FIGS. 2A to 2D are diagrams illustrating examples of procedures of merging a nested loop.

Referring to the examples illustrated in FIGS. 1 and 2A, an assembly code may include a plurality of code blocks, for example, five code blocks. In this example, 'mov A, B' represents a command to store a value of B in A, 'add A←B, C' represents a command to sum up values of B and C and store the resultant value in A, 'bne A, B, C' represents a command to execute a code block corresponding to C if A and B are not the same as each other, and otherwise execute a code block subsequent to a current code block. #0x0, #0x10, and the like indicate hexadecimal numbers. In this example, 'bne' command is a loop control command, and '#0x10' indicates loop execution frequency information. For example, '#0x10' may be represented by 16 in the decimal system.

The extracting unit 105 may extract first loop execution frequency information 202 from a loop control command 201 from among commands included in an inner loop 200. In this example, the first loop execution frequency information 202 is "#0x10," which is represented by 16 in the decimal system. The extracting unit 105 may extract second loop execution frequency information 212 from a loop control command 211 from among commands included in an outer loop 210. In this example, the second loop execution frequency information is "#0x8," which is represented by 8 in the decimal system.

Figure 2B:
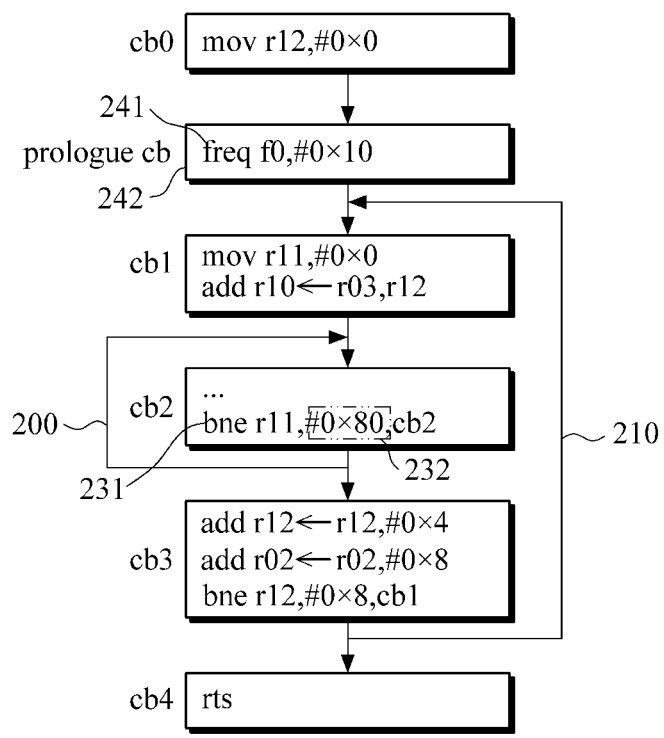

Referring to the example illustrated in FIG. 2B, the loop merging unit 110 may generate third loop execution frequency information 232 based on the first loop execution frequency information 202 of the inner loop and based on the second loop execution frequency information 212 of the outer loop. For example, the loop merging unit 110 may multiply the first loop execution frequency information 202 and the second loop execution frequency information 212 to obtain the third loop execution frequency information 232. As an example, the loop merging unit 110 may multiply 16 which is the first loop execution frequency and 8 which is the second loop execution frequency, and use the multiplication result of 128 as the third loop execution frequency information 232.

The loop merging unit 110 may generate a loop control command 231 for executing commands of the merged loop as many times as the third loop execution frequency information 232. The loop merging unit 110 may delete the loop control command 201 from the inner loop and the loop control command 212 from the outer loop.

The loop merging unit 110 may generate a storage command 241 for storing the first loop execution frequency information in the frequency register file 150. In this example, 'freq A, B' indicates a command to store B in A. For example, 'freq f0, #0×10' may be a command to store "#0×10" at a location corresponding to f0 in the frequency register file 150. The loop merging unit 110 may generate a new code block 242, and insert the generated storage command 241 in the newly generated code block 242.

Figure 2C:
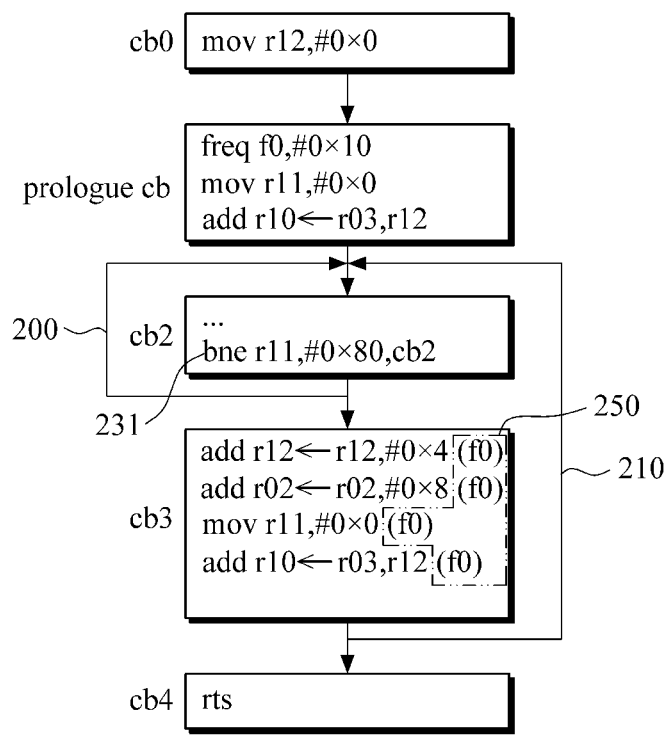

Referring to the example illustrated in FIG. 2C, the loop merging unit 110 may utilize a loop peeling technique to copy commands that are present in a code block cb1 (shown in FIG. 2B) to code blocks prologue cb and cb3 (shown in FIG. 2C). The loop merging 110 may insert execution operands 'f0' 250 which include location information indicating where the first loop execution frequency information is stored in the frequency register file into a command of the outer loop.

Figure 2D:
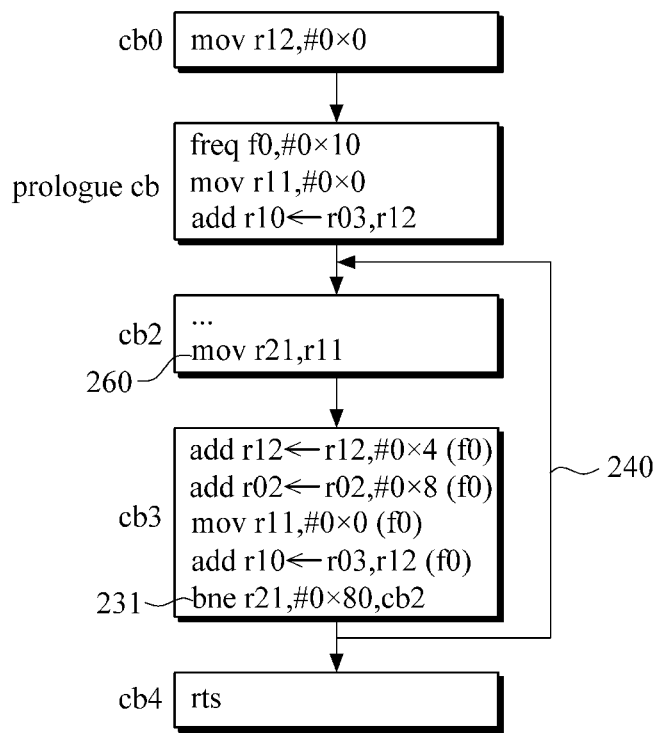

Referring to the example illustrated in FIG. 2D, the loop merging unit 110 may move the loop control command 231 to the bottom of the code block cb3. In this example, the loop control command 231 is the last command to be executed from among the commands of the inner and outer loops. For example, the loop merging unit 231 may generate and insert a move command 260 in code block cb2 to move a value stored in a register 'r11' included in the loop control command 231 to a different register 'r21,' and change the register 'r11' included in the loop control command 231 to the register 'r21.' The changed loop control command 231 may be moved to the bottom of the code block cb3.

If the loop control command 231 is moved to the bottom of the code block cb3 without changing the register, the value included in the register 'r11' of the loop control command 231 may be changed by a command 'move r11, #0×0 (f0)' of the code block cb3. Accordingly, to prevent such change, the register of the loop control command may be changed after the move command 260 is generated and inserted in the code block cb2.

The loop merging unit 110 may merge the inner loop and the outer loop into one loop 240.

The control unit 151 may determine whether an execution operand 'f0' is present in the allocated commands. For example, in response to the execution operand being present, the control unit 151 may be allowed to execute the command allocated to the PE1 each time the first loop execution frequency stored in the frequency register file 150 becomes the same as the counter value of the counter 152. As another example, in response to the execution operand not being present, the control unit 151 may be allowed to execute the command allocated to the PE1 regardless of the first loop execution frequency and the counter value. The counter 152 may increase a value at each occasion of a predefined event. For example, the counter 152 may increase a value each time the loop is executed once.

Figure 3:
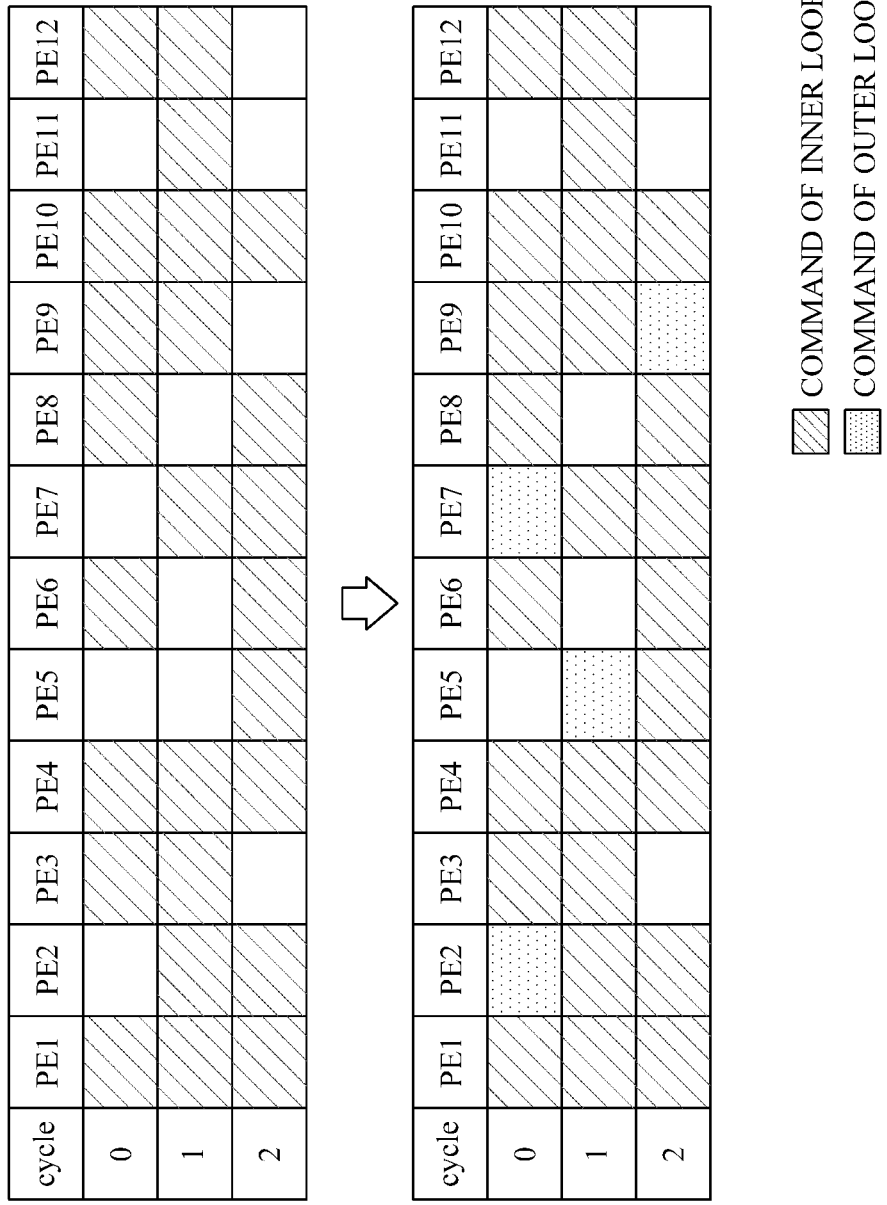
FIG. 3 is a diagram illustrating an example of the statuses of PEs to which commands of an inner loop and an outer loop are allocated.

FIG. 3 illustrates an example of the statuses of PEs to which commands of an inner loop and an outer loop are allocated.

Referring to the examples illustrated in FIGS. 1 and 3, the PEs are executed at each cycle. For example, a merged loop may be executed each time all cycles 0, 1, and 2 are executed. For example, 8 times execution of the merged loop may indicate that the cycles 0, 1, and 2 are executed 8 times. That is, the merged loop may include a plurality of cycles, for example, three cycles.

The counter 152 may increase a value at each occasion of a predefined event. As an example, the counter 152 may increase a value each time a command included in the loop is executed. In other words, the counter 152 may increase a value at each cycle. As another example, the counter 152 may increase a value each time the loop is executed. For example, the counter 152 may increase a value after all of the cycles 0, 1, and 2 have been executed.

The scheduler 120 may allocate commands of the inner loop of the merged loop to some of a plurality of PEs PE1, PE2, PE3, PE4, PE5, PE6, PE7, PE8, PE9, PE10, PE11, and PE12. The scheduler 120 may allocate commands of the outer loop of the merged loop to the PEs which are not allocated with the commands of the inner loop.

By allocating the commands included in the inner loop to the PEs and allocating the commands included in the outer loop to the rest of the PEs, the reconfigurable processor may process the outer loop in parallel with the inner loop without influencing the inner loop. Therefore, the reconfigurable processor may reduce processing time to process the nested loop that includes both the inner loop and the outer loop.

Figure 4:
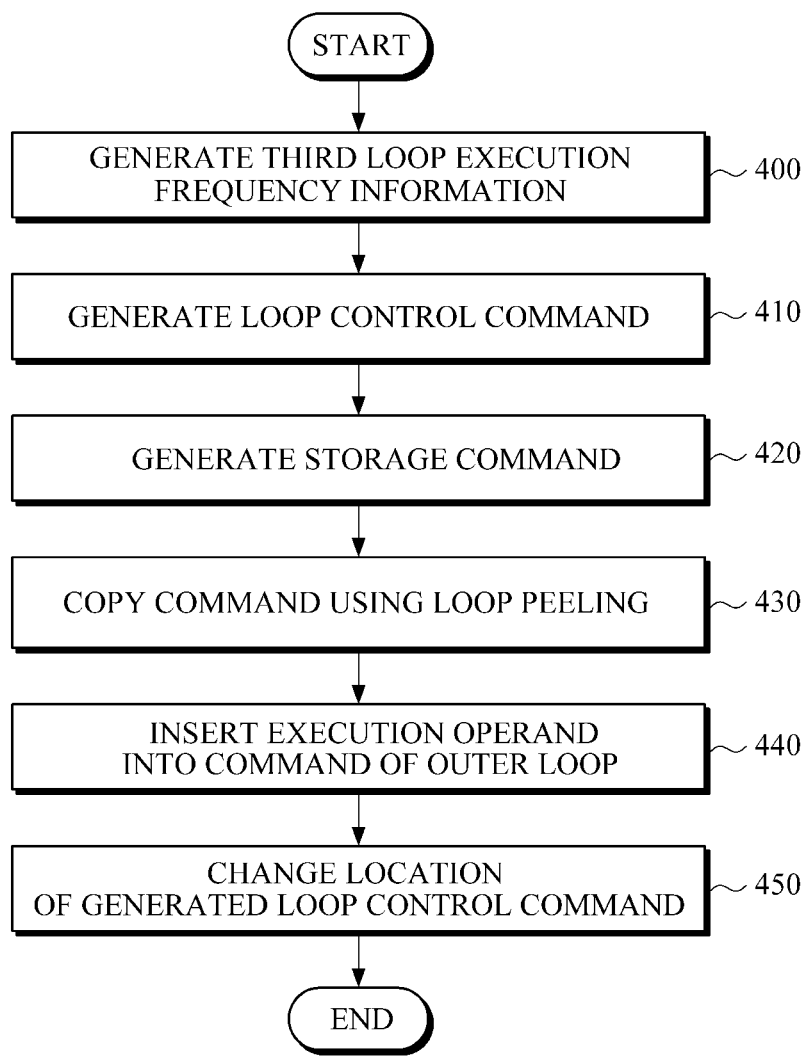
FIG. 4 is a flowchart of an example of a method of merging a nested loop.

FIG. 4 illustrates an example of a method of merging a nested loop.

Referring to the examples illustrated in FIGS. 1 and 4, the first loop execution frequency information and the second loop execution frequency information may be extracted from the loop control commands of the respective inner loop and outer loop. The third loop execution frequency information is generated based on the first loop execution frequency information of the inner loop and the second loop execution frequency information of the outer loop, in 400.

A loop control command is generated to execute the commands of a merged loop as many times as a value of the third loop execution frequency information, in 410. For example, the value of the third loop execution frequency information may be a product of the first loop execution frequency information and the second loop execution frequency information.

A storage command to store the first loop execution frequency information in the frequency register file is generated, in 420. A location of the command is changed using loop peeling technique, in 430. An execution operand including location information indicating where the first loop execution frequency information is stored in the frequency register file is generated and inserted into a command of the outer loop, in 440. The generated loop control command is changed, in 450. For example, the generated loop command may be changed in its location such that the loop control command becomes the last command to be executed among the commands included in the merged loop. As described above, the nested loop can be merged.

As another example, a plurality of loops may be merged together. For example, if three or more nested loops are present, the three or more nested loops may be merged into one loop based on the above described procedures. For example, if a first loop, a second loop, and a third loop are nested loops, and the first loop is the innermost loop, the first and second loops may be merged together as described above. Then, the merged loop may be merged with the third loop in the same manner as the above.

Figure 5:
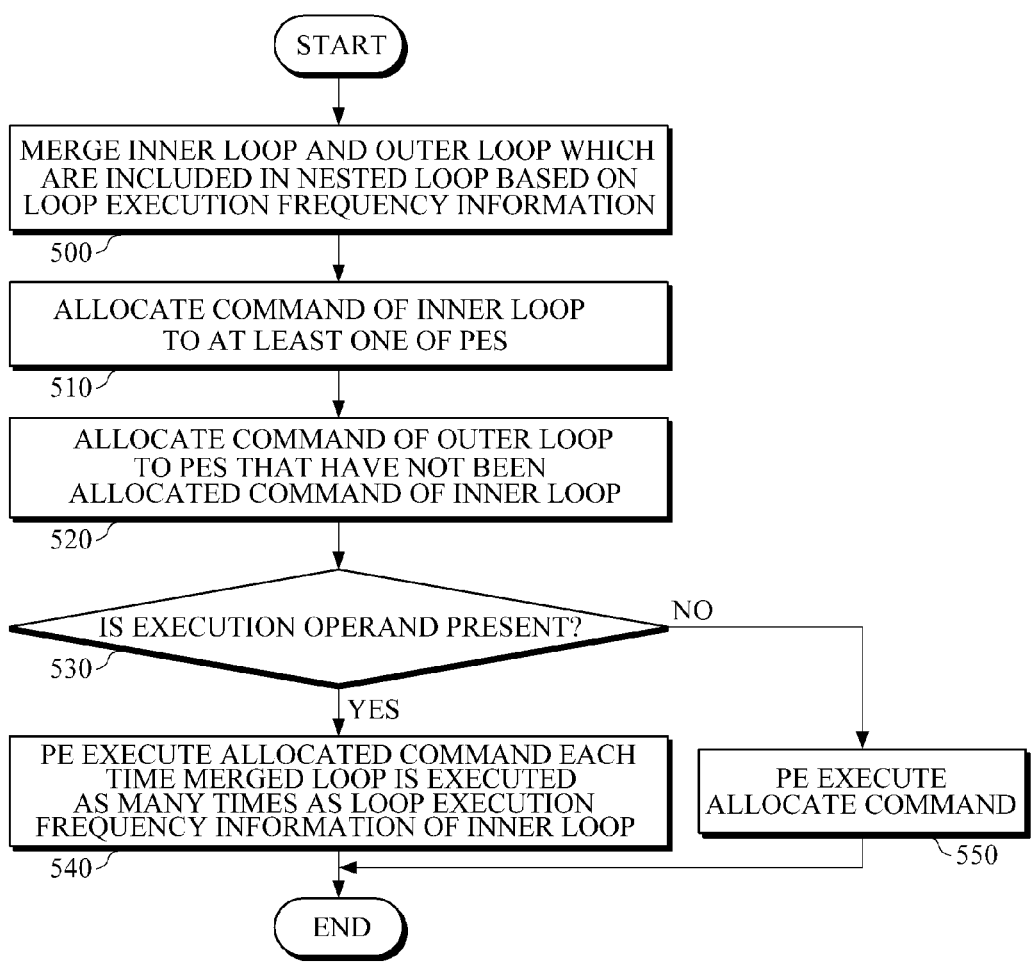
FIG. 5 is a flowchart of an example of a method of processing a nested loop.

FIG. 5 illustrates an example of a method of processing a nested loop.

Referring to FIGS. 4 and 5, loop execution frequency information may be extracted from each of the inner loop and the outer loop which are included in the nested loop. The inner loop and the outer loop of the nested loop are merged together based on the extracted loop execution frequency information, in 500. The merging may be performed in the same manner as the example illustrated in FIG. 4.

A command of the inner loop of the merged loop is allocated to at least one of a plurality of PEs, in 510. A command of the outer loop of the merged loop is allocated to one or more of the PEs which have not been allocated with the command of the inner loop, in 520. Whether an execution operand is present in the allocated command is determined, in 530. In response to the execution operand being present, the PEs execute the allocated commands each time the first loop execution frequency information becomes the same as the counter value, in 540. In response to no execution operand being present, the PEs execute the allocated commands regardless of the first loop execution frequency and the counter value, in 550.

As described above, the method of merging the nested loop merges the inner loop and the outer loop which are included in the nested loop, and allocates the merged loop to the PEs in parallel, thereby reducing processing time to process the nested loop.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor for processing a nested loop, the reconfigurable processor comprising:
    processing elements that are physically reconfigurable;
    an extracting unit extracting loop execution frequency information from each of an inner loop and an outer loop which are included in the nested loop;
    a loop merging unit merging the inner loop and the outer loop based on the extracted loop execution frequency information; and
    a scheduler allocating a command of the inner loop to one of the processing elements, and allocating a command of the outer loop to one of the processing elements that excludes the command of the inner loop, wherein each of the processing elements comprises
        a frequency register file storing first loop execution frequency information, and
        a counter increasing a counter value at each occasion of a predefined event, and outputting the counter value.

2. The reconfigurable processor of claim 1, wherein the loop merging unit is further configured to generate third loop execution frequency information based on the first loop execution frequency information of the inner loop and second loop execution frequency information of the outer loop, and to generate a loop control command to control commands of the merged loop to be executed as many times as a value of the third loop execution frequency information.

3. The reconfigurable processor of claim 1, wherein the loop merging unit is further configured to copy a command of the inner loop and/or a command of the outer loop using a loop peeling technique.

4. The reconfigurable processor of claim 2, wherein the loop merging unit is further configured to generate a storage command to store the first loop execution frequency information in the frequency register file.

5. The reconfigurable processor of claim 4, wherein the loop merging unit is further configured to insert an execution operand into the command of the outer loop, the execution operand comprising location information indicating where the first loop execution frequency information is stored in the frequency register file.

6. The reconfigurable processor of claim 5, wherein each of the processing elements is further configured to determine whether the execution operand is present in the allocated command, and in response to determining that the execution operand is present, to execute the allocated command each time the first loop execution frequency information stored in the frequency register file becomes the same as the counter value.

7. The reconfigurable processor of claim 4, wherein the counter is further configured to increase the counter value each time a command included in the loop is executed or each time the loop is executed.

8. The reconfigurable processor of claim 2, wherein the loop merging unit is further configured to extract the first loop execution frequency information and the second loop execution frequency information from loop control commands of the inner loop and outer loop, respectively.

9. The reconfigurable processor of claim 2, wherein the value of the third loop execution frequency information is a product of a value of the first loop execution frequency information and a value of the second loop execution frequency information.

10. The reconfigurable processor of claim 1, wherein the processing elements are configured to process the command of the inner loop and the command of the outer loop in parallel.

11. A method of processing a nested loop in a reconfigurable processor, the method comprising:
   extracting loop execution frequency information from each of an inner loop and an outer loop, which are included in the nested loop;
   merging the inner loop and the outer loop of the nested loop based on the extracted loop execution frequency information;
   allocating a command of the inner loop to one of processing elements that are physically reconfigurable; and
   allocating a command of the outer loop to one of the processing elements that excludes the command of the inner loop, wherein the merging of the inner loop and the outer loop comprises generating a storage command to store first loop execution frequency information in a frequency register file included in each of the processing elements.

12. The method of claim 11, wherein the merging of the inner loop and the outer loop comprises generating third loop execution frequency information based on the first loop execution frequency information of the inner loop and second loop execution frequency information of the outer loop; and
   generating a loop control command to control commands of the merged loop to be executed as many times as a value of the third loop execution frequency information.

13. The method of claim 11, wherein the merging of the inner loop and the outer loop comprises copying a command of the inner loop and/or a command of the outer loop using a loop peeling technique.

14. The method of claim 12, wherein the merging of the inner loop and the outer loop comprises inserting an execution operand into the command of the outer loop, the execution operand including location information indicating where the first loop execution frequency information is stored in the frequency register file.

15. The method of claim 14, further comprising:
   determining whether the execution operand is present in the allocated command; and
   in response to determining that the execution operand is present, executing the allocated command each time the first loop execution frequency information stored in the frequency register file becomes the same as a counter value output from a counter.

16. The method of claim 15, wherein the counter increases the counter value each time a command included in the inner loop is executed or each time the inner loop is executed, and the counter outputs the counter value.

17. The method of claim 12, wherein the extracting of the loop execution frequency information comprises extracting the first loop execution frequency information and the second loop execution frequency information from loop control commands of the inner loop and outer loop, respectively.

18. The method of claim 12, wherein the value of the third loop execution frequency information is a product of a value of the first loop execution frequency information and a value of the second loop execution frequency information.

19. The method of claim 11, wherein the processing elements are configured to process the command of the inner loop and the command of the outer loop in parallel.

* * * * *